United States Patent [19]
Mori

[11] Patent Number: 5,559,618
[45] Date of Patent: Sep. 24, 1996

[54] LIQUID CRYSTAL COMPENSATOR SATISFYING NX>NZ>NY HAVING NY AND NZ INCLINED

[75] Inventor: Hiroyuki Mori, Kanagawa, Japan

[73] Assignee: Fuji Photo Film Co., Ltd., Minami-ashigara, Japan

[21] Appl. No.: 327,794

[22] Filed: Oct. 20, 1994

[30] Foreign Application Priority Data

Oct. 22, 1993 [JP] Japan ................... 5-264996

[51] Int. Cl.⁶ ..................... G02F 1/1335; G02F 1/133
[52] U.S. Cl. ................................ 359/73; 359/63
[58] Field of Search .................... 359/73, 494, 63

[56] References Cited

U.S. PATENT DOCUMENTS

| | | | |
|---|---|---|---|
| 3,924,930 | 12/1975 | Dewhirst et al. | 359/50 |
| 5,175,638 | 12/1992 | Kanemoto et al. | 359/73 |
| 5,184,237 | 2/1993 | Iimura et al. | 359/73 |
| 5,194,975 | 3/1993 | Akatsuka et al. | 359/73 |
| 5,227,903 | 7/1993 | Miyazawa et al. | 359/73 |
| 5,245,456 | 9/1993 | Yoshimi et al. | 359/73 |
| 5,375,006 | 12/1994 | Haas | 359/73 |
| 5,490,006 | 2/1996 | Matsumoto et al. | 359/73 |

FOREIGN PATENT DOCUMENTS

| | | | |
|---|---|---|---|
| 0576304 | 12/1993 | European Pat. Off. . | |
| 2-285303 | 11/1990 | Japan . | |
| 2308128 | 12/1990 | Japan | 359/73 |
| 4-120512 | 4/1992 | Japan . | |
| 4-113301 | 4/1992 | Japan . | |
| 5-80323 | 4/1993 | Japan . | |
| 5-157913 | 6/1993 | Japan | 359/73 |
| 5157911 | 6/1993 | Japan | 359/494 |
| 5196818 | 8/1993 | Japan | 359/73 |
| 6-174920 | 6/1994 | Japan | 359/73 |

OTHER PUBLICATIONS

Patent Abstracts of Japan, vol. 17, No. 553 (P-1625) 5 Oct. 1993 & JP-A-05 157 913 (Seiko Epson) 25 Jun. 1993.
Patent Abstracts of Japan, vol. 16, No. 365 (P-1397) 6 Aug. 1992 & JP-A-04 113 301 (Asahi) 14 Apr. 1992.
Patent Abstracts of Japan, vol. 16, No. 377 (P-1401) 12 Aug. 1992 & JP-A-04 120 512 (Asahi) 21 Apr. 1992.
Patent Abstracts of Japan, vol. 17, No. 416 (P-1584) 3 Aug. 1993 & JP-A-05 080 323 (NEC) 2 Apr. 1993.

*Primary Examiner*—Anita Pellman Gross
*Assistant Examiner*—Toan Ton That
*Attorney, Agent, or Firm*—Burns, Doane, Swecker & Mathis, LLP

[57] ABSTRACT

Disclosed is an optical compensatory sheet which has nx, ny and nz satisfying the condition of nx>nz>ny wherein nx, ny and nz represent main refractictive indices, and wherein the direction of nx is on the plane of the sheet, the direction of ny is inclined from the plane of the sheet and the direction of nz is inclined from the normal of the sheet, the directions of ny and nz crossing each other at a right angle, and a liquid crystal display provided with the optical compensatory sheet.

9 Claims, 7 Drawing Sheets

LIQUID CRYSTAL COMPENSATOR SATISFYING NX>NZ>NY HAVING NY AND NZ INCLINED

BACKGROUND OF THE INVENTION

1. Field of the Invention

The present invention relates to an optical compensatory sheet employable for compensating phase difference of a liquid crystal cell, and a liquid crystal display provided with the optical compensatory sheet.

2. Description of Prior Art

As a display for electronic office system-devices such as a desk-top personal computer and a word processor for Japanese language, CRT (cathode ray tube) has been employed so far. Recently, a liquid crystal display (hereinafter referred to as LCD) is increasingly employed instead of the CRT because of its thin thickness, light weight and low power consumption. LCD generally has a structure that a liquid crystal cell is disposed between a pair of polarizing sheets. Most of LCD use a twisted nematic liquid crystal or a super twisted nematic liquid crystal.

A super twisted nematic liquid crystal display (hereinafter referred to as STN-LCD) has been recently utilized for dot-matrix type liquid crystal displays such as those of word processors and personal computers. The liquid crystal display generally has a structure that a liquid crystal cell is disposed between a pair of polarizing sheets. The STN-LCD uses a super twisted nematic liquid crystal showing a twisted angle of 180 to 270 degrees. Such STN-LCD has an advantage of showing a high contrast on high multiplexing drive, compared with the conventional twisted nematic liquid crystal display (twisted angle: 90 degrees) which can be utilized for the dot-matrix type liquid crystal displays.

However, the STN-LCD has a disadvantage of giving a displayed image inherently colored with the hue from blue or yellow owing to elliptically polarized light transmitted through STN liquid crystal cell. This phenomenon may be hereinafter referred to as coloring. In the STN-LCD, high contrast cannot be obtained in black-and-white display and it is difficult to obtain color image.

In order to avoid the coloring of the displayed image, there have been proposed a liquid crystal display having one or three layers of optically anisotropic body (that is, NTN mode-display) and a liquid crystal display using a uniaxial stretched polymer film (that is, FTN mode-display).

The former NTN mode-display shows excellent characteristics in black-and-white display. The liquid crystal cell for optically anisotropic body used in the NTN mode-display is voluminous and a plurality of such cells are required, so that the NTN mode-display is large in volume and weight, and high in production cost compared with the FTN mode-display using a uniaxial stretched polymer film. Hence, the uniaxial stretched polymer film is mainly used as the optical compensatory film.

Various polymer films (optical compensatory films (birefringence films)), for example a uniaxial stretched polycarbonate film, have been developed for the purpose of the elimination of coloring of the STN-LCD. Thus, the coloring is reduced and the display provided with the film shows almost a black-and-white image.

The above liquid crystal display provided the uniaxial stretched film has been improved in elimination of coloring, so far as the coloring when the display is viewed from the direction vertical to the screen is concerned. However, when the liquid crystal display is viewed from an oblique direction, unfavorable viewing angle characteristics such as coloring and lowering of contrast of a displayed image and reversing of black-and-white image are observed.

To improve the above viewing angle characteristics, a method of employing both of a film of positive intrinsic birefringence and a film of negative intrinsic birefringence or employing their composite, and method of employing merely a film of negative intrinsic birefringence have been proposed. These methods, however, scarcely give improvement of the viewing angle characteristics.

Japanese Patent Provisional Publication No. 2(1990)-285330 discloses that a birefringence film wherein a refractive index in a thickness direction is larger than that in a direction perpendicular to an optic axis of birefringence is employed as the optical compensatory sheet. Such sheet satisfies the condition of nx>nz>ny wherein nx, ny and nz represent main refractive indices. The use of the birefringence film brings about enhancement of contrast to some extent when the display is viewed from an oblique direction. However, the sheet does not satisfactorily improve the viewing characteristics.

Further, optical compensatory sheets having oblique optic axis or oblique nz (thickness direction) have been proposed (Japanese Patent Provisional Publications No. 4(1992)-120512, No. 4(1992)-113301, No. 5(1993)-80323 and No. 5(1993)-157913).

Japanese Patent Provisional Publication No. 4(1992)-120512 discloses an optical sheet whose polymer chain is polarized in the direction at a certain angle to the plane of the sheet. This sheet is considered to satisfy nx>nz =ny or nx=nz>ny and have oblique optic axis (that only the direction of nz is inclined). Japanese Patent Provisional Publication No. 4(1992)-113301 discloses an optical sheet whose polymer has an average oriented direction arranged at a certain angle to the plane of the sheet. Japanese Patent Provisional Publication No. 5(1993)-80323 discloses an optical sheet whose optic axis is inclined to the plane of the sheet. These two sheets are prepared by obliquely slicing a uniaxial polycarbonate film, and therefore the sheets are considered to satisfy nx>nz=ny and to have oblique optic axis (in which all three directions of nx, nz and ny are inclined).

Japanese Patent Provisional Publication No. 5(1993)-157913 also discloses an optical sheet that the direction of nz is inclined from the plane of the sheet. Further, the sheet satisfies the condition of nx>nz>ny.

The above optical compensatory sheets having oblique optic axis also do not improve satisfactorily the viewing angle characteristics such as coloring and contrast of a displayed image, and reversing of black-and-white image, when the liquid crystal display is viewed from an oblique direction.

When the viewing direction to the liquid crystal display is inclined from the normal to a surface of the display, quality of the displayed image depends upon not only (nx−ny)·d (=Re; retardation (d:thickness)) but also (nx−nz)·d or (nz−ny)·d. The sheet satisfying the condition of nx>nz>ny (Japanese Patent Provisional Publication No. 2(1990)-285330) is designed in consideration of the above relationship of retardation. The sheet decreases luminance of black displayed portion, when the display is viewed from an oblique direction, in normally black mode that is widely adopted in STN-LCD.

In the sheet, tilt angle produced by orientation of liquid crystal in a liquid crystal cell is not considered. Therefore, the viewing angle characteristics such as coloring and contrast of a displayed image and reversing of black-and-white image, when the display is viewed from an oblique direction, are not satisfactorily improved. It is reported that the tilt angle of liquid crystal used for STN-LCD brings about asymmetry of optimum Re in all viewing directions (The 37th Applied Physics Society, 30a-D-10, Spring, 1990).

As is described above, the optical compensatory sheets having oblique optic axis or oblique nz (thickness direction) are also proposed. Especially, Japanese Patent Provisional Publication No. 5(1993)-157913 discloses an optical sheet whose optic axis is inclined from the plane of the sheet and which satisfies the condition of nx>nz>ny. However, the sheet does not satisfactorily improve the viewing angle characteristics.

SUMMARY OF THE INVENTION

The inventor has studied the reason and found that it is because the oblique nz of the sheet is formed by inclining the plane of nx and nz from the normal of the sheet. In more detail, ny having the minimum refractive index of those of nx, ny and nz, is on the plane of the sheet, and the plane of nx and nz is inclined from the normal of the sheet. According to study of the inventor, it has been apparent that such sheet scarcely compensates the asymmetric property of Re.

It is an object of the present invention to provide a novel optical compensatory sheet which shows enhanced contrast and reduced coloring in a displayed image and enhanced luminance in black-and-white image when the viewing direction to the liquid crystal display is inclined from the normal to a surface of the display.

It is another object of the present invention to provide a liquid crystal display provided with a novel optical compensatory sheet which shows enhanced contrast and reduced coloring in a displayed image and enhanced luminance in black-and-white image when the viewing direction to the liquid crystal display is inclined from the normal to a surface of the display.

It is a further object of the present invention to provide a liquid crystal display using super twisted liquid crystal provided with a novel optical compensatory sheet shows enhanced contrast and reduced coloring in a displayed image and enhanced luminance in black-and-white image when the viewing direction to the liquid crystal display is inclined from the normal to a surface of the display.

There is provided by the invention an optical compensatory sheet which has main refractive indices of nx, ny and nz satisfying the condition of nx>nz>ny, wherein the direction of nx is on the plane of the sheet, the direction of ny is inclined from the plane of the sheet and the direction of nz is inclined from the normal to the sheet, the directions of ny and nz crossing each other at right angle.

Preferred embodiments of the optical compensatory sheet are as follows:

1) The optical compensatory sheet wherein the direction of nz is inclined at 5 to 50 degrees to the normal (i.e., normal line) of the sheet.

2) The optical compensatory sheet which shows retardation of 50 to 1,000 nm to a light having wavelength of 632.8 nm.

3) The optical compensatory sheet as defined in claim 1, nx, ny and nz further satisfy the condition of:

$$0.2 \leq (nx-nz)/(nx-ny) \leq 0.8$$

wherein nx, ny and nz have the same meanings as defined above.

4) The optical compensatory sheet which is made of a polycarbonate film.

There is further provided by the invention a liquid crystal display comprising a liquid crystal cell which comprises a pair of substrates provided with a transparent electrode and liquid crystal sealed therebetween, a pair of polarizing sheets arranged on both sides of the cell, and an optical compensatory sheet provided between the liquid crystal cell and the polarizing sheet;

wherein the optical compensatory sheet has main refractive indices of nx, ny and nz satisfying the condition of nx>nz>ny, in which the direction of nx is on the plane of the sheet, the direction of ny is inclined from the plane of the sheet and the direction of nz is inclined from the normal to the sheet, the directions of ny and nz crossing each other at right angle.

Preferred embodiments of the liquid crystal display are as follows:

1) The liquid crystal display wherein a pair of the optical compensatory sheets are provided on both sides of the liquid crystal cell, and are arranged in such a manner that the surfaces of the sheets of the sides to which the directions of ny and nz are inclined face to the surfaces of the liquid crystal cell, and angle between two directions of nx of the two sheets is divided (preferably equally divided) by a bisector of twist angle of the liquid crystal.

2) The liquid crystal display wherein the liquid crystal is twisted nematic liquid crystal or super twisted nematic liquid crystal (preferably super twisted nematic liquid crystal).

The optical compensatory sheet of the invention shows greatly enhanced contrast and reduced coloring in a displayed image and enhanced luminance in black-and-white image when the viewing direction is inclined from the normal to a surface of the display. Thus, the liquid crystal display provided with the optical compensatory sheet shows excellent viewing characteristics described above.

Particularly, in the case of normally black mode of STN-LCD, viewing angle is increased and bright white image can be obtained.

Further, the optical compensatory sheet of the invention is also advantageously employed for an active matrix liquid crystal display such as TFT or MIN.

DETAILED DESCRIPTION OF THE INVENTION

The optical compensatory sheet of the invention is explained below.

Figure 1:
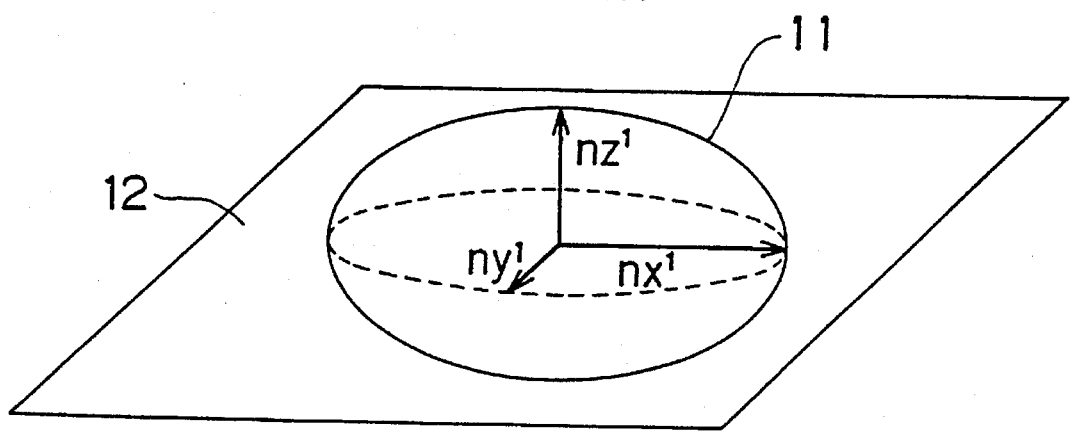
FIG. 1 is a view schematically showing the index ellipsoid of a conventionally employed optical compensatory sheet.

The index ellipsoid of the conventionally employed optical compensatory sheet is shown in FIG. 1.

The reference number 11 is an index ellipsoid of the optical compensatory sheet and the reference number 12 is a surface of the optical compensatory sheet. The reference numbers "$nx^1$" and "$ny^1$" are main refractive indices on the plane of the sheet, and the reference number "$nz^1$" is a main refractive index in a thickness direction of the sheet (i.e., in the direction perpendicular to the plane of the sheet). In the index ellipsoid, "$nx^1$" and "$ny^1$" satisfy $nx^1 > ny^1$. A uniaxial stretched polymer film generally has the index ellipsoid indicated in FIG. 1.

Figure 2:
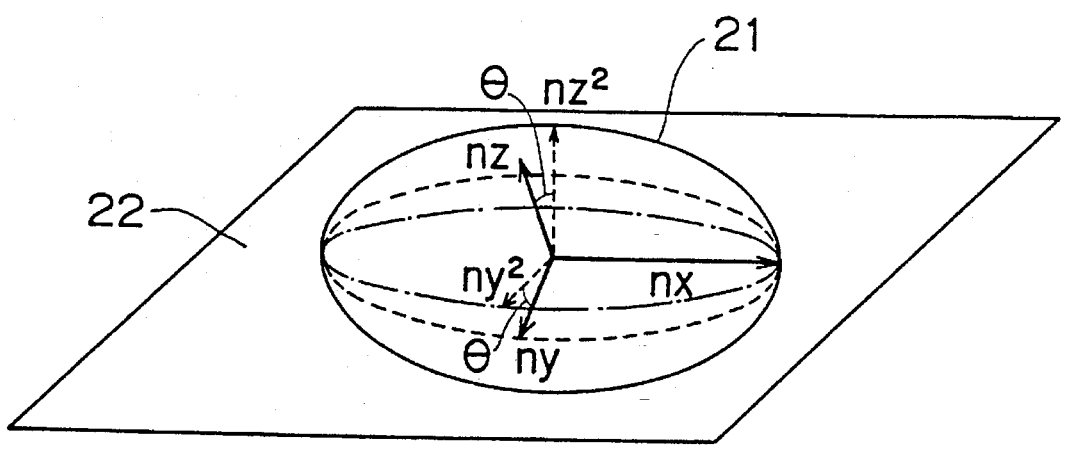
FIG. 2 is a view schematically showing the index ellipsoid of the optical compensatory sheet of the invention.

The index ellipsoid of the optical compensatory sheet of the invention is shown in FIG. 2.

The reference number 21 is an index ellipsoid of the optical compensatory sheet and the reference number 22 is a surface of the optical compensatory sheet. The reference numbers "nx", "ny" and "nz" are main refractive indices. The direction of "nx" is on the plane of the sheet, and the directions of nx and nz are inclined at angle θ by being rotated around the direction of "nx". In more detail, the direction of "ny" is inclined at angle θ from the plane of the sheet (i.e., at angle θ from "$y^2$" which is on the plane of the sheet and is refractive index in the direction perpendicular to "nx") and the direction of nz is inclined at angle θ from the normal of the sheet (i.e., at angle θ from "$z^2$" which is refractive index in the direction perpendicular to the sheet).

Angle θ preferably is 5 to 40 degrees, more preferably 5 to 30 degrees and especially 12 to 30 degrees. In FIG. 2, "nx", "ny" and "nz" further satisfy the condition of nx >nz>ny. Further, "nx", "ny" and "nz" satisfy the condition of:

$$0.2 \leq (nx-nz)/(nx-ny) \leq 0.8$$

wherein nx, ny and nz have the same meanings as defined above.

In the invention, the retardation (Re) viewed from the front direction preferably is 50 to 1,000 nm (especially 200 to 600) when it is measured by the use of a light having wavelength of 632.8 nm. The retardation (Re) is determined by product ($\Delta n \cdot d$) of birefringence $\Delta n$ ($=nx-ny^2$) and the thickness of the sheet "d".

Figure 3:
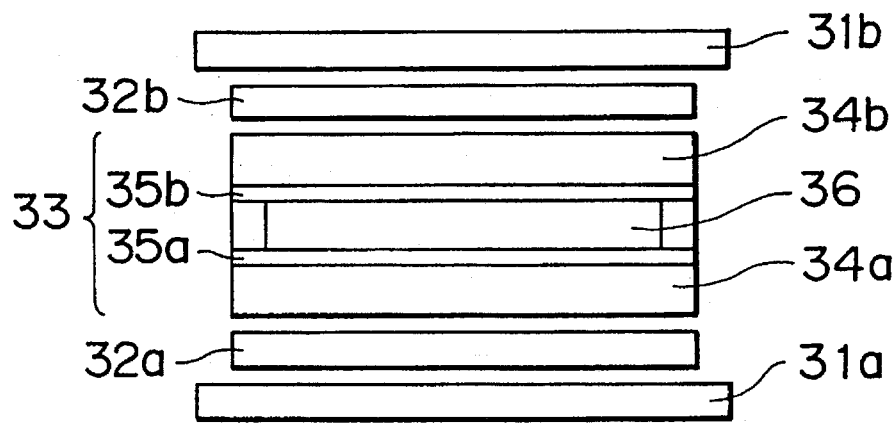
FIG. 3 is a sectional view schematically showing the representative structure of the liquid crystal display of the invention.

The representative structure of the liquid crystal display provided with the optical compensatory sheet according to the invention is shown in FIG. 3.

Transparent substrate 34a and transparent electrode 35a, and transparent substrate 34b and transparent electrodes 35b are superposed, respectively, and the electrodes 35a, 35b are arranged facing each other, between which super twisted nematic liquid crystal 36 is sealed. In this manner, a liquid crystal cell 33 is constructed. The optical compensatory sheets 32a, 32b are provided on the substrates 34a, 34b of the liquid crystal cell, respectively, and polarizing plates 31a, 31b are arranged on both sides (optical compensatory sheets 32a, 32b) of the liquid crystal cell, to constitute the liquid crystal display.

The optical compensatory sheet may be arranged only on one side (i.e., use of one of 32a and 32b). Further, the two optical compensatory sheets may be arranged only on one side in the form of their composite. As liquid crystal, a liquid crystal (e.g., twisted nematic liquid crystal) other than the super twisted nematic liquid crystal may be employed.

Figure 4:
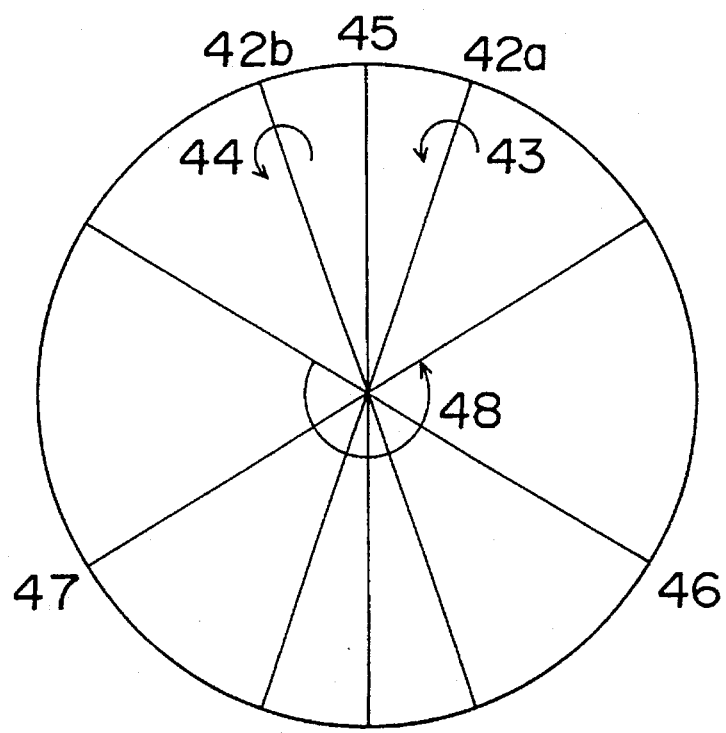
FIG. 4 is a perspective view obtained when the liquid crystal display of FIG. 3 is viewed from upper direction, which shows the arrangement of the directions of the main refractive indices and various directions in the liquid crystal display of FIG. 3.

The arrangement of the directions of the main refractive indices and various directions in the liquid crystal display of FIG. 3 is shown in FIG. 4.

FIG. 4 is a perspective view obtained when the liquid crystal display of FIG. 3 is viewed from upper direction. The direction of nx of the lower optical compensatory sheet (32a in FIG. 3) 42a, the direction of nx of the upper optical compensatory sheet (32b in FIG. 3) 42b, the rubbing direction on the lower transparent substrates (34a in FIG. 3) 46, the rubbing direction on the upper transparent substrates (34a in FIG. 3) 47, the bisector of twist angle of the liquid crystal 45, the twist angle of the liquid crystal 48, the inclined direction of nz (direction of nz rotating around nx) of the lower optical compensatory sheet 43 and the inclined direction of nz of the upper optical compensatory sheet 44, are indicated.

The above arrangement is preferably formed by placing the surfaces of the sheets of the sides to which the directions of ny and nz are inclined facing to the surfaces of the liquid crystal cell, and adjusting the angle between two directions of nx of the two sheets to be divided (preferably equally divided) by a bisector of twist angle of the liquid crystal 45.

The optical compensatory sheet of the invention can be prepared in the following manner:

The optical compensatory sheet may be in the form of film, plate, composite or support provided a coated film. The optical compensatory sheet preferably has a transmittance of not less than 80% and specially not less than 90%. Examples of material employed for the optical compensatory sheet include polymer, optical isomerization substance (low molecular weight compound and polymer) and liquid crystal (low molecular weight compound and polymer).

As polymer material employed in the invention, any material can be employed so long as they are transparent.

Examples of the above polymers include polycarbonate, polyallylate, polysulfone, polyether sulfone, polyethylene terephthalate, polyphenylene sulfide, polyphenylene oxide, polyallylsulfone, polyvinyl alcohol, polyamide, polyimide, polyolefin (e.g., ZEONEX 280 of Nippon Geon Co., Ltd.), polyvinyl chloride, cellulose derivatives (e.g., triacetyl cellulose), polyacrylonitrile, polystyrene and polymethylmethacrylate. The above polymer may be a homopolymer, a copolymer, a derivative thereof or a blended composition comprising two or more kinds of the polymers.

The optical compensatory sheet can be, for example, prepared using the above polymer in the following manner.

The polymer film is rolled by passing between two pressure rollers having peripheral speed different from each other (whereby nz is inclined), the resultant continuous film is then uniaxially stretched in the width direction (whereby width direction (usually ny) is transformed to the direction having maximum reflective index (i.e., nx) and further the following process for compressing a film is performed to obtain a sheet satisfying the condition of nx >nz>ny. To obtain such optical compensatory sheet, the peripheral speed ratio and the stretching ratio are appropriately changed depending upon nature of used polymer.

Figure 5:
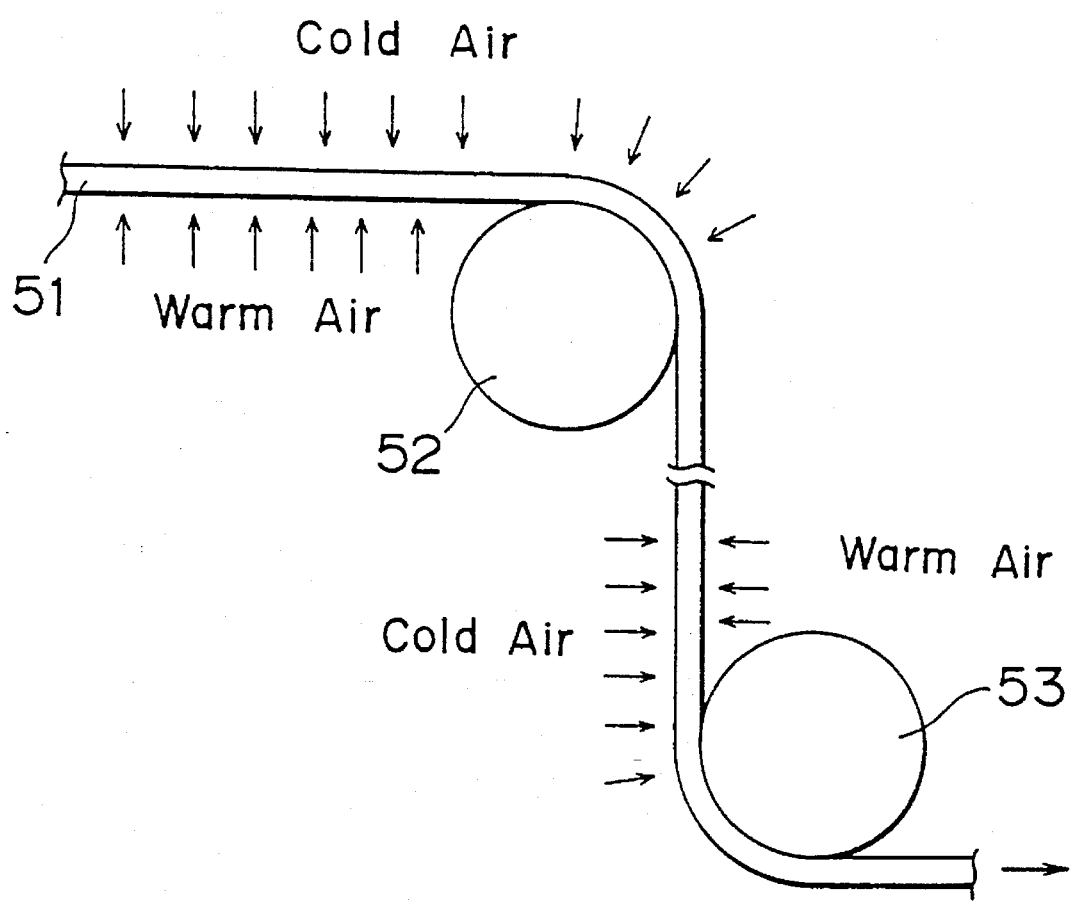
FIG. 5 is a view showing a process for compressing a film.

The process for compressing a film is, for example, performed according to the process shown in FIG. 5. Cold air (e.g., 0° C.) is applied to the upper side of the stretched film 51 and warm air is applied to the lower side, and then the film 51 provided with the surfaces having different temperatures each other is in contact with a heated roller 52 with applying cold air to the upper side, to bend the film along the roller. Then, the resultant film is reversed and subjected to the same process as above except for using a heated roller 53. The two processes (1 cycle) are generally performed as many as 2 to 20 times.

Alternatively, the polymer film is rolled by passing between two pressure rollers having peripheral speed different from each other (whereby nz is inclined), and the resultant continuous film is then diaxially stretched at an appropriate stretching ratio (whereby width direction (usually ny) is transformed to nx and nx>nz>ny is obtained). To obtain such optical compensatory sheet, the peripheral speed ratio and the stretching ratio are appropriately changed depending upon nature of used polymer.

The optical compensatory sheet can be also prepared using optical isomerizable substance. The optical isomerization substance means one that can be converted into streoisomer or structural isomer by means of a light. The optical isomerizable substance preferably is one that can be reversely isomerized (i.e., returned to the original substance) by means of a light having wavelength different from that used in the above isomerization or by application of heat. Examples of the optical isomerizable substance employed in the invention include azobenzene compounds, benzaldoxime compounds, azomethine compounds, stilbene compounds, spiropyran compounds, spiroxazine compounds, fulgide compounds, diarylester compounds, cinnamic acid derivatives, retinal compounds and hemithioindigo compounds. The optical isomerizable substance further includes polymers having groups derived from the above compounds or derivatives. Such polymers may have an optical isomerization group on the main chain or the side chain.

The optical compensatory sheet can be, for example, prepared using the above optical isomerizable substance in the following manner.

A layer of the optical isomerizable substance (e.g., polymer) satisfying the condition of nx>nz>ny is obliquely irradiated with a light (whereby ny and nz are inclined) to prepare the sheet. Alternatively, the sheet can be obtained by obliquely irradiating a layer of the optical isomerizable substance and polymer satisfying the condition of nx>nz>ny with a light or by forming a layer of the optical isomerizable substance on a polymer film satisfying the condition of nx>nz>ny and obliquely irradiating the layer with a light.

Examples of the present invention and comparison examples are given below, but these examples by no means restrict the invention.

EXAMPLE 1

Polycarbonate (weight-average molecular weight: 120,000) prepared by polycondensation of phosgene and bisphenol A was dissolved in dichloromethane to prepare a solution of 18 weight %. The polymer solution was casted on a steel drum to form a continuous film. Then, the continuous film was continuously peeled off and dried to prepare a continuous film of thickness of 200 μm. As to this film, Re to a light of 632.8 nm (wavelength) was measured by an ellipsometer (AEP-100, available from Shimadzu Seisakusho, Ltd.). The resultant value of Re was 150 nm. The Re is assumed to be produced by the tension when the film was peeled off.

The film was subjected to heat-relaxation at 190° C. Re of the film became almost 0. The film was rolled by passing between two heated pressure rollers having peripheral speed different from each other to prepare the film having nz inclined from the normal. The resultant film was uniaxially stretched in the width direction at 180° C.

Further, according to the process for compressing a film shown in FIG. 5, cold air (0° C.) was applied to the upper side of the stretched film 51 and warm air was applied to the lower side, and the film 51 having the surfaces of different temperatures was in contact with a heated roller 52 (diameter: 12.5 m; temperature: 158° C.) with applying cold air to the upper side, to bend the film along the roller. The processed film had the upper side of temperature of 128° C. and the lower side of temperature of 158° C. Then, the film was reversed and was subjected to performance of the same process as above except for using a heated roller 53. The two processes (1 cycle) were performed 10 times.

nx, ny and nz of the obtained film were determined by an ellipsometer (AEP-100, available from Shimadzu Seisakusho, Ltd.). As a result, nx was 1.585, ny was 1.579 and nz was 1.582, and thus the resultant film satisfied the condition of nx>nz>ny. Further, it was apparent that the direction of nx was on the plane of the sheet, the direction of ny was inclined from the plane of the sheet, the direction of nz was inclined from the normal of the sheet, and the inclined angles both were 15 degrees. Moreover, Re measured with a light of 632.8 nm was 385 nm.

To STN-liquid crystal cell in the personal word-processor "WD-A551" (manufactured by Sharp Corporation), the obtained sheets were fixed as shown in FIG. 3 to obtain STN-LCD. The arrangement of the directions of the main refractive indices of the sheet and various directions of the liquid crystal display was formed as shown in FIG. 4. In more detail, under the conditions that a light source was placed under the polarizing plate 31a and a clockwise direction to the course of the light was made to positive, angle between the direction of nx of the lower optical compensatory sheet 42a and the bisector of twist angle of the liquid crystal 45 was made to 10 degrees and angle between the direction of nx of the upper optical compensatory sheet 42b and the bisector of twist angle of the liquid crystal 45 was made to −10 degrees.

Evaluation of viewing characteristics

Figure 6:
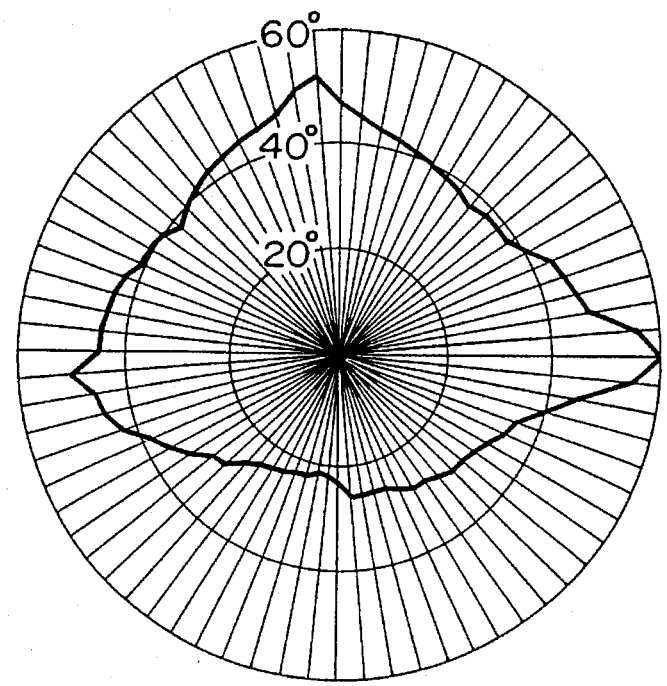
FIG. 6 is a graph indicating viewing characteristics with regard to contrast of STN-LCD obtained in Example 1.
Figure 7:
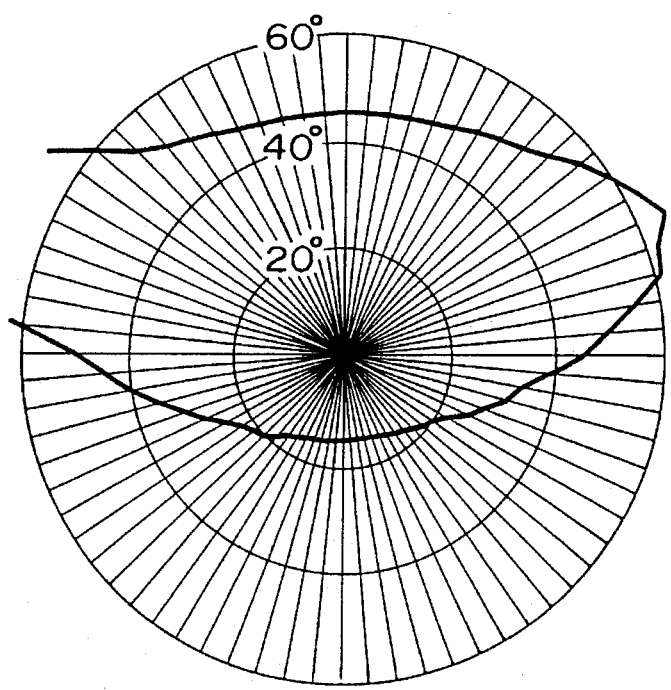
FIG. 7 is a graph indicating viewing characteristics with regard to luminance of white image portion of STN-LCD obtained in Example 1.

The viewing characteristics of STN-LCD obtained in Example 1 are shown in FIG. 6 and FIG. 7. FIG. 6 indicates viewing characteristics with regard to contrast, and FIG. 7 indicates viewing characteristics with regard to luminance of white image portion. In figures, the center indicates viewing characteristics viewed from the front side of the display, and the upper direction indicates those viewed from direction inclined to the upper side from the center, the lower direction indicates those viewed from direction inclined to the lower side, the left direction indicates those viewed from direction inclined to the left side and the right direction indicates those viewed from direction inclined to the right side. The concentric circles indicate, in order from the center, inclined angles of 20 degrees, 40 degrees and 60 degrees.

The bold curve in FIG. 6 indicates an equal contrast line of STN-LCD obtained in Example 1. The bold curve in FIG. 7 indicates an equal luminance line of STN-LCD obtained in Example 1 (luminance: relative value). These results showed that TN-LCD of Example 1 had high contrast and luminance in the wide range of viewing angles.

COMPARISON EXAMPLE 1

The same polymer solution as Example 1 was casted on a steel drum to form a continuous film. Then, the continuous film was continuously peeled off and dried to prepare a continuous film of thickness of 60 μm and Re of 85 nm. The resultant continuous film was uniaxially stretched in the length direction at 180° C.

nx, ny and nz of the obtained film were determined in the same manner as Example 1. As a result, nx was 1.587, ny and nz were 1.580, and the direction of nz was not inclined from the normal of the sheet. Moreover, Re measure with a light of 632.8 nm was 385 nm.

STN-LCD was prepared using the obtained film in the same manner as Example 1.

Figure 8:
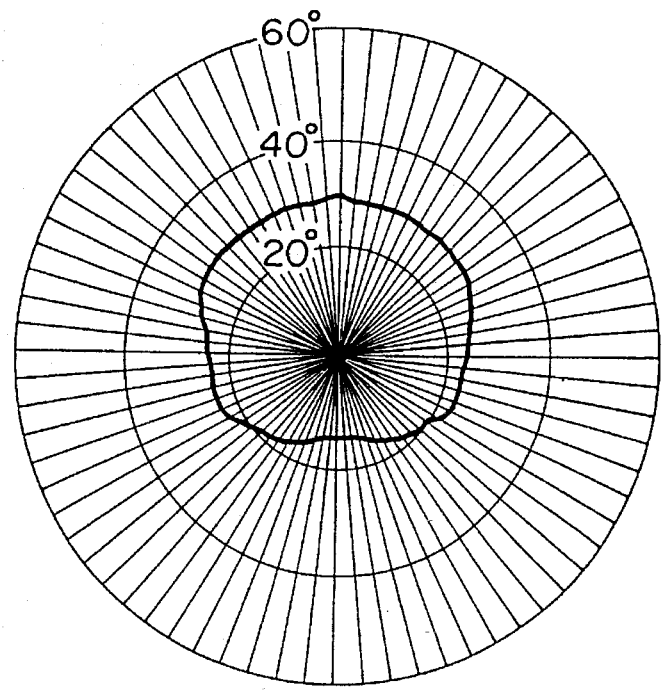
FIG. 8 is a graph indicating viewing characteristics with regard to contrast of STN-LCD obtained in Comparison Example 1.
Figure 9:
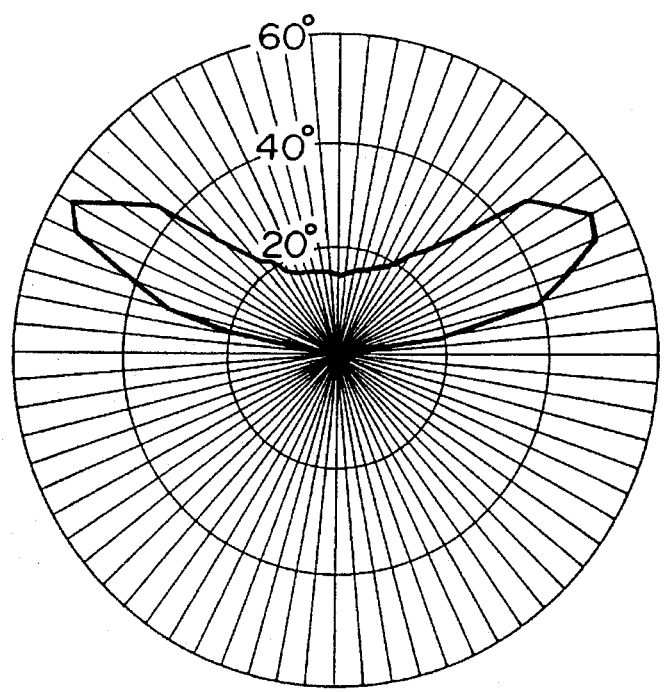
FIG. 9 is a graph indicating viewing characteristics with regard to luminance of white image portion of STN-LCD obtained in Comparison Example 1.

The viewing characteristics of STN-LCD obtained in Comparison Example 1 are shown in FIG. 8 and FIG. 9. The bold curve in FIG. 8 indicates an equal contrast line of STN-LCD of Comparison Example 1. The bold curve in FIG. 9 indicates an equal luminance line of STN-LCD of Comparison Example 1. These results showed that TN-LCD of Comparison Example 1 had high contrast and luminance in the narrow range of viewing angles.

COMPARISON EXAMPLE 2

The same polymer solution as Example 1 was casted on a steel drum to form a continuous film. Then, the continuous film was continuously peeled off and dried to prepare a continuous film of thickness of 200 μm and Re of 150 nm. The continuous film was subjected to heat-relaxation at 190° C. Re of the film became almost 0.

The film was subjected to the process for compressing a film shown in FIG. 5 in the same manner as Example 1. Thereafter, the resultant film was uniaxially stretched in the length direction at 180° C.

nx, ny and nz of the obtained film were determined in the same manner as Example 1. As a result, nx was 1.585, ny was 1.579 and nz were 1.582, and the direction of nz was not inclined from the normal of the sheet. Moreover, Re to a light of 632.8 nm was 385 nm.

STN-LCD was prepared using the obtained film in the same manner as Example 1.

Figure 10:
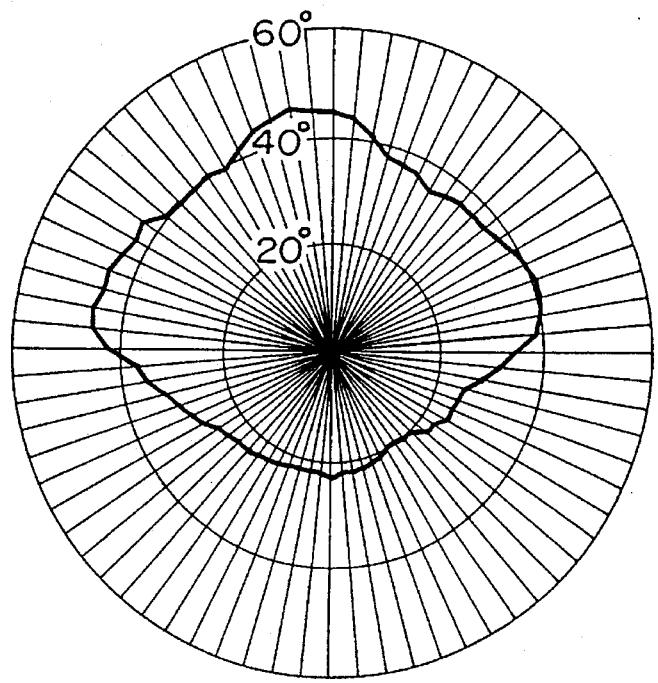
FIG. 10 is a graph indicating viewing characteristics with regard to contrast of STN-LCD obtained in Comparison Example 2.
Figure 11:
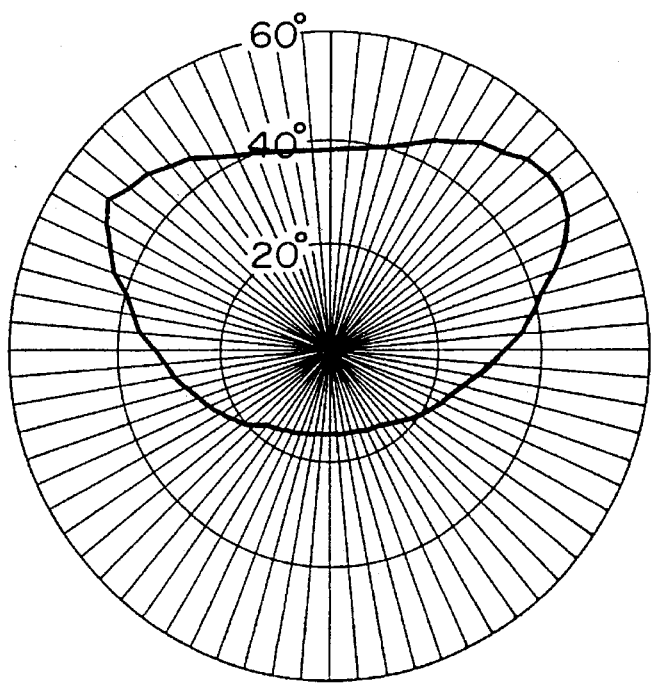
FIG. 11 is a graph indicating viewing characteristics with regard to luminance of white image portion of STN-LCD obtained in Comparison Example 2.

The viewing characteristics of STN-LCD obtained in Comparison Example 2 is shown in FIG. 10 and FIG. 11. The bold curve in FIG. 10 indicates an equal contrast line of STN-LCD of Comparison Example 2. The bold curve in FIG. 11 indicates an equal luminance line of STN-LCD of Comparison Example 2. These results showed that TN-LCD of Comparison Example 2 did not have high contrast and luminance in the wide range of viewing angles.

COMPARISON EXAMPLE 3

The same polymer solution as Example 1 was casted on a steel drum to form a continuous film. Then, the continuous film was continuously peeled off and dried to prepare a continuous film of thickness of 200 μm and Re of 150 nm. The continuous film was subjected to heat-relaxation at 190° C. Re of the film became almost 0. The continuous film was rolled by passing between two heated pressure rollers having peripheral speed different from each other to prepare the film having nz inclined from the normal.

The continuous film was subjected to the process for compressing a film shown in FIG. 5 in the same manner as Example 1. Thereafter, the resultant film was uniaxially stretched in the length direction at 180° C.

nx, ny and nz of the obtained film were determined in the same manner as Example 1. As a result, nx was 1.585, ny was 1.579 and nz were 1.582. Further, it was apparent that the direction of ny was on the plane of the sheet, the direction of nx was inclined from the plane of the sheet, the direction of nz was inclined from the normal of the sheet, and the inclined angles both were 10 degrees. Moreover, Re measured with a light of 632.8 nm was 385 nm.

STN-LCD was prepared using the obtained film in the same manner as Example 1.

Figure 12:
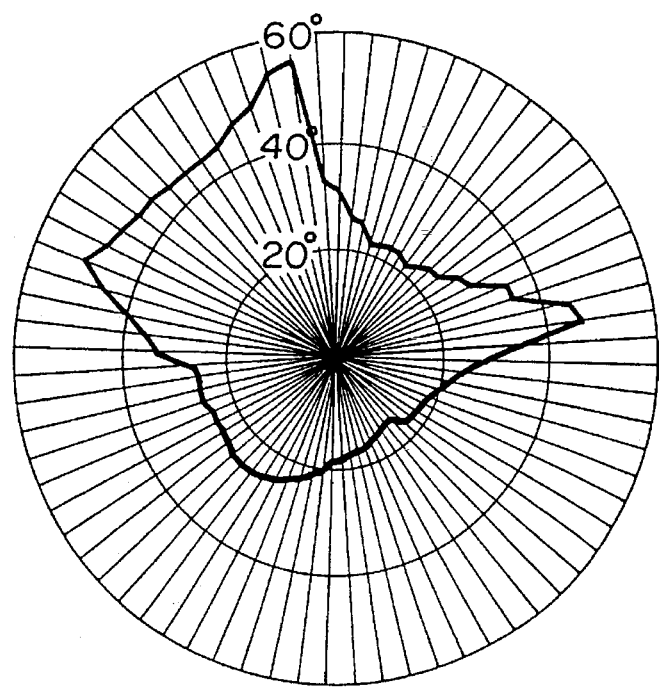
FIG. 12 is a graph indicating viewing characteristics with regard to contrast of STN-LCD obtained in Comparison Example 3.
Figure 13:
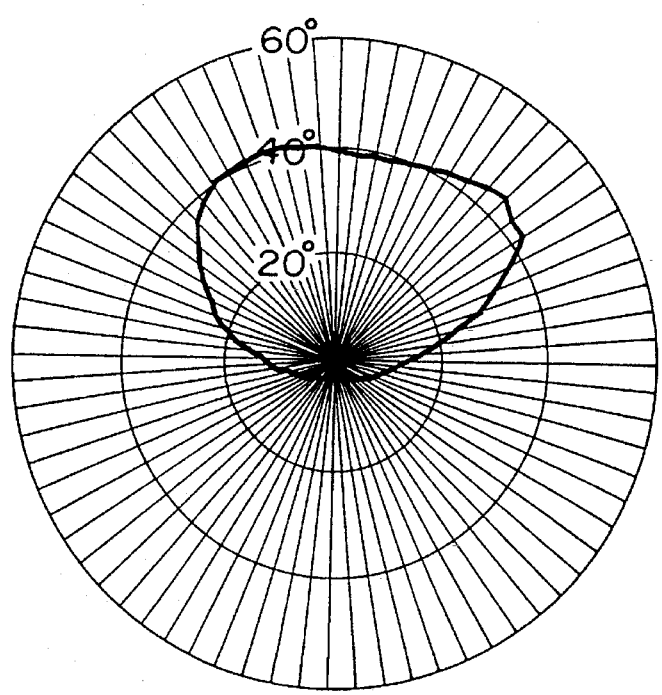
FIG. 13 is a graph indicating viewing characteristics with regard to luminance of white image portion of STN-LCD obtained in Comparison Example 3.

The viewing characteristics of STN-LCD obtained in Comparison Example 3 is shown in FIG. 12 and FIG. 13. The bold curve in FIG. 12 indicates an equal contrast line of STN-LCD of Comparison Example 3. The bold curve in FIG. 13 indicates an equal luminance line of STN-LCD of Comparison Example 3. These results showed that TN-LCD of Comparison Example 3 did not have high contrast and luminance in the wide range of viewing angles.

I claim:

1. An optical compensatory sheet which has main refractive indices of nx, ny and nz satisfying the condition of nx>nz>ny, wherein the direction of nx is on the plane of the sheet, the direction of ny is inclined from the plane of the sheet and the direction of nz is inclined at 5 to 50 degrees from the normal to the sheet, the directions of ny and nz crossing each other at a right angle.

2. The optical compensatory sheet as defined in claim 1, which shows a retardation of 50 to 1,000 nm to a light having a wavelength of 632.8 nm.

3. The optical compensatory sheet as defined in claim 1, nx, ny and nz further satisfy the condition of:

$$0.2 \leq (nx-nz)/(nx-ny) \leq 0.8.$$

4. A liquid crystal display comprising a liquid crystal cell which comprises a pair of substrates each of which is provided with a transparent electrode and liquid crystal sealed therebetween, a polarizing sheet arranged on each side of the cell, and an optical compensatory sheet provided between at least one side of the liquid crystal cell and the polarizing sheet;

wherein the optical compensatory sheet has main refractive indices of nx, ny and nz satisfying the condition of nx>nz>ny, in which the direction of nx is on the plane of the sheet, the direction of ny is inclined from the plane of the sheet and the direction of nz is inclined at a 5 to 50 degrees from the normal to the sheet, the directions of ny and nz crossing each other at a right angle.

5. The liquid crystal display as defined in claim 4, wherein the optical compensatory sheet is provided on each side of the liquid crystal cell to form a pair of optical compensatory sheets, and the optical compensatory sheets are arranged in such a manner that the surfaces of the sheets of the sides to which the directions of ny and nz are inclined face to the surfaces of the liquid crystal cell, and an angle formed where two directions of nx of the two sheets cross each other is equally divided by a bisector of a twist angle of the liquid crystal.

6. The liquid crystal display as defined in claim 4, wherein the liquid crystal is super twisted nematic liquid crystal.

7. A liquid crystal display comprising a liquid crystal cell which comprises a pair of substrates each of which is provided with a transparent electrode and liquid crystal sealed therebetween, a polarizing sheet arranged on each side of the cell, and an optical compensatory sheet provided between at least one side of the liquid crystal cell and the polarizing sheet;

wherein the optical compensatory sheet has main refractive indices of nx, ny and nz satisfying the condition of nx>nz>ny, in which the direction of nx is on the plane of the sheet, the direction of ny is inclined from the plane of the sheet and the direction of nz is inclined at 5 to 50 degrees from the normal to the sheet, the directions of ny and nz crossing each other at a right angle; and the optical compensatory sheet further shows retardation of 50 to 1,000 nm to light having a wavelength of 632.8 nm.

8. The liquid crystal display as defined in claim 7, wherein the optical compensatory sheet is provided on each side of the liquid crystal cell to form a pair of optical compensatory sheets, and the optical compensatory sheets are arranged in such a manner that the surfaces of the sheets of the sides to which the directions of ny and nz are inclined face to the surfaces of the liquid crystal cell, and an angle formed where two directions of nx of the two sheets cross each other is equally divided by a bisector of a twist angle of the liquid crystal.

9. The liquid crystal display as defined in claim 7, wherein the liquid crystal is super twisted nematic liquid crystal.

\* \* \* \* \*